United States Patent
Tseng et al.

(10) Patent No.: US 9,162,680 B1
(45) Date of Patent: Oct. 20, 2015

(54) METHOD OF CONTROLLING AUTOMATIC TRANSMISSION COASTING DOWNSHIFT

(71) Applicant: FORD GLOBAL TECHNOLOGIES, LLC, Dearborn, MI (US)

(72) Inventors: Hongtei Eric Tseng, Canton, MI (US); Christopher John Teslak, Plymouth, MI (US); Bradley Dean Riedle, Northville, MI (US); Jeffrey Allen Doering, Canton, MI (US); Tobias John Pallett, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/300,604

(22) Filed: Jun. 10, 2014

(51) Int. Cl.
| | |
|---|---|
| *B60W 10/02* | (2006.01) |
| *B60W 30/19* | (2012.01) |
| *B60W 30/18* | (2012.01) |
| *B60W 30/188* | (2012.01) |
| *B60W 10/06* | (2006.01) |
| *B60W 10/115* | (2012.01) |
| *F16H 61/14* | (2006.01) |
| *F16H 61/00* | (2006.01) |

(52) U.S. Cl.
CPC ............. *B60W 30/19* (2013.01); *B60W 10/023* (2013.01); *B60W 10/06* (2013.01); *B60W 10/115* (2013.01); *B60W 30/188* (2013.01); *B60W 30/18072* (2013.01); *F16H 2061/0012* (2013.01); *F16H 2061/145* (2013.01)

(58) Field of Classification Search
USPC .......................................................... 477/73
See application file for complete search history.

(56) References Cited

U.S. PATENT DOCUMENTS

| | | | | |
|---|---|---|---|---|
| 5,305,663 | A  * | 4/1994 | Leonard et al. | ............... 475/123 |
| 7,366,601 | B2 | 4/2008 | Ayabe et al. | |
| 8,100,802 | B2 | 1/2012 | Lee et al. | |
| 8,366,587 | B2 | 2/2013 | Inoue et al. | |
| 8,568,275 | B2 * | 10/2013 | Inagaki et al. | ............... 477/162 |
| 2010/0145586 | A1 | 6/2010 | Holtz | |

* cited by examiner

*Primary Examiner* — Ramya Burgess
*Assistant Examiner* — David Morris
(74) *Attorney, Agent, or Firm* — James Dottavio; Brooks Kushman P.C.

(57) ABSTRACT

A method of controlling a transmission and engine during a coasting downshift is particularly suited to transmission arrangements exhibiting strong inertia coupling. During the inertia phase of the downshift, a third clutch such as a torque converter bypass clutch is modulated to control output torque. Simultaneously, engine torque is modulated to control engine speed. The resulting control scheme is only semi-coupled.

17 Claims, 6 Drawing Sheets

METHOD OF CONTROLLING AUTOMATIC TRANSMISSION COASTING DOWNSHIFT

TECHNICAL FIELD

This disclosure relates to the field of transmission controls. More particularly, the disclosure pertains to a method of controlling a transmission during a coasting downshift event.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of engine speed to driveshaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Many automatic transmissions implement a discrete number of different transmission speed ratios in which each ratio is establish by engaging a particular subset of clutches. A clutch that selectively holds a gearing element against rotation may be called a brake. Some clutches may be actively controlled devices such as by hydraulically actuated multi-plate wet clutches. Other clutches may be passive devices such as one way clutches. To shift from one speed ratio to another speed ratio, one clutch is engaged and another clutch is released. A shift to a lower speed ratio is called an upshift. An upshift may occur in response to an increase in vehicle speed or in response to a decrease in driver demanded power. A shift to a lower speed ratio, on the other hand, is called a downshift. A downshift may occur in response to a driver demand for more power, or in response to the vehicle slowing down.

During a shift, the vehicle speed changes only slightly, but engine speed may change significantly. The change in engine speed is often opposite to the trend before and after the shift. For example, as a vehicle accelerates in a given speed ratio, engine speed gradually increases. However, during an upshift, the engine speed decreases. The torque exerted at the transmission output during a shift varies both because the torque ratio changes and because torque is either diverted to speeding up the engine or is generated by slowing the engine. Drivers and other vehicle occupants have expectations regarding output torque and engine speed and are dissatisfied when the actual output torque or engine speed behaves differently than expected.

Although the normal flow of power is from the engine to the wheels, power may flow in the opposite direction when the vehicle is coasting. Some power is needed to keep the engine rotating. If the engine generates less than this amount of power, the power is supplied by the transmission. Vehicle occupants experience this as slight increase in deceleration rate compared to how quickly the vehicle would slow down with the transmission in neutral. When a downshift occurs during coasting, the engine speed increases. If the energy to increase the engine speed is provided by the transmission, vehicle deceleration may increase noticeably during the downshift contrary to vehicle expectations. Unfortunately, the torque capacity of the oncoming clutch strongly influences both the output torque and the rate of change of engine speed, complicating the task of matching both output torque and engine speed to driver expectations.

Many transmissions are controlled by an electronic controller. The controller sets parameters such as the pressure provided to various clutches. The parameters set by the controller influence a number of characteristics observable by vehicle occupants, such as output torque and engine speed. The objective of control algorithms is to set the controlled parameters such that the observable characteristics have desired values. In a closed loop control scheme, the controller utilizes a measurement of the observable characteristics as feedback signals, adjusting the controllable parameters in response to differences between the measured quantities and the desired values. A system with multiple controllable parameters and multiple feedback signals is decoupled if changes in each control parameter influence only one feedback signal. Decoupled systems are easier to control than strongly coupled systems because each controlled parameter can be set independently of the others. In a semi-coupled system, the controlled parameters can be set in an order such that changes in later parameters do not influence the feedback signals used to set the earlier parameters.

SUMMARY OF THE DISCLOSURE

A method of controlling a transmission during a negative torque downshift includes reducing an off-going clutch torque capacity and increasing an oncoming clutch torque capacity during a torque transfer phase followed by modulating the torque capacity of a third clutch based on an output torque feedback signal. The third clutch may be a torque converter bypass clutch. The output torque feedback signal may be provided by a torque sensor or may be inferred based on a rate of acceleration. The method may further include modulating an input power source torque based on a second feedback signal. The input power source may be an internal combustion engine. The second feedback signal may be an input speed or an input acceleration.

A transmission includes a discrete ratio gearbox, a clutch configured to transmit torque between an engine and the gearbox, and a controller. The clutch may be, for example, a torque converter bypass clutch. The controller is programmed to downshift the gearbox while power flows from the transmission output to the engine by modulating the clutch torque capacity during an inertia phase based on an output torque feedback signal.

A transmission controller includes input communications channels, output communications channels, and control logic. The input communications channels receive a signal indicating transmission output torque and may also receive an input speed signal. The output communications channels send a signal to vary torque capacity of a torque converter bypass clutch and may also send a signal to vary engine torque. The control logic downshifts the transmission while power flows from the transmission output to a transmission input by modulating the bypass clutch torque capacity based on the output torque signal. During the downshift, the control logic may also modulate the engine torque based on the input speed signal.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
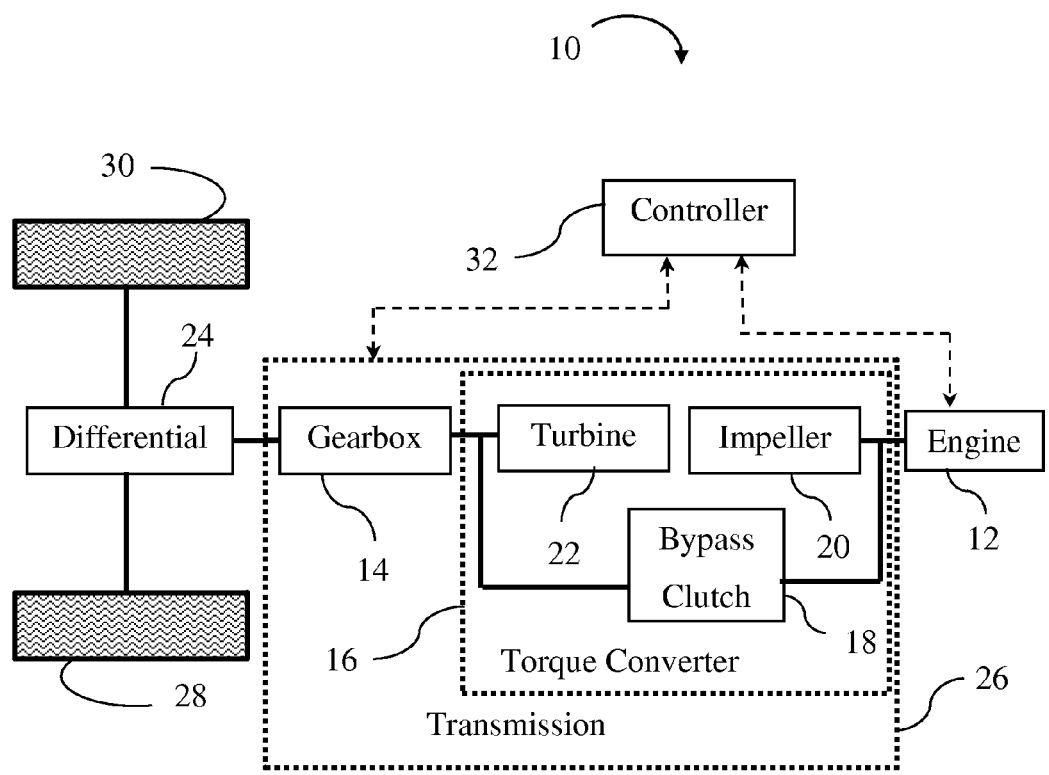
FIG. 1 is a schematic of a vehicle powertrain suitable for use with the disclosed method.

A vehicle powertrain 10 is illustrated schematically in FIG. 1. Power to propel the vehicle is provided by internal combustion engine 12. The power is transmitted to gearbox 14 by torque converter 16. Torque converter 16 provides two alternative power flow paths. When bypass clutch 18 is engaged, it transmits the power. When bypass clutch 18 is open, power is transferred hydro-dynamically through impeller 20 and turbine 22. The turbine torque is a function of the speed of the impeller and the speed of the turbine. Power is transferred from the impeller to the turbine only when the impeller rotates faster than the impeller. When the ratio of impeller speed to turbine speed is high enough, the turbine torque is a multiple of the impeller torque. Gearbox 14 transmits power from torque converter 16 to differential 24 at various speed ratios. At low vehicle speeds, the gearbox multiplies the turbine torque. At high vehicle speeds, the gearbox may use an overdrive ratio that increases speed and decreases torque. Torque converter 16, gearbox 14, and associated controls collectively form transmission 26. Differential 24 further multiplies the torque by a fixed ratio and changes the axis of rotation by 90 degrees. Differential 24 transmits approximately equal torques to right and left wheels 28 and 30 while accommodating slight speed differences between the wheels as the vehicle turns. Wheels 28 and 30 convert the torque into a tractive force against the road surface. Although FIG. 1 illustrated a longitudinal powertrain, the powertrain may also be mounted transversely, in which case the axis of rotation of the engine and transmission is parallel to, but offset from, the wheel axis.

Controller 32 sends signals to engine 12 to control the amount of power produced. These signals may impact, for example, the fuel flow, the throttle opening, and spark timing. Controller 32 also receives signals from engine 12 such as crankshaft speed. Controller 32 also sends signals to transmission 26 to control the state of engagement or release of bypass clutch 18 and various clutches and brakes within gearbox 14. Controller 32 receives signals from transmission 26 such as turbine speed, driveshaft speed, and driveshaft torque. Controller 32 also receives signals from driver activated controls such as the accelerator pedal, brake pedal, and transmission range sensor (PRNDL). Controller 32 may be implemented as a single controller or as multiple communicating controllers.

Figure 2:
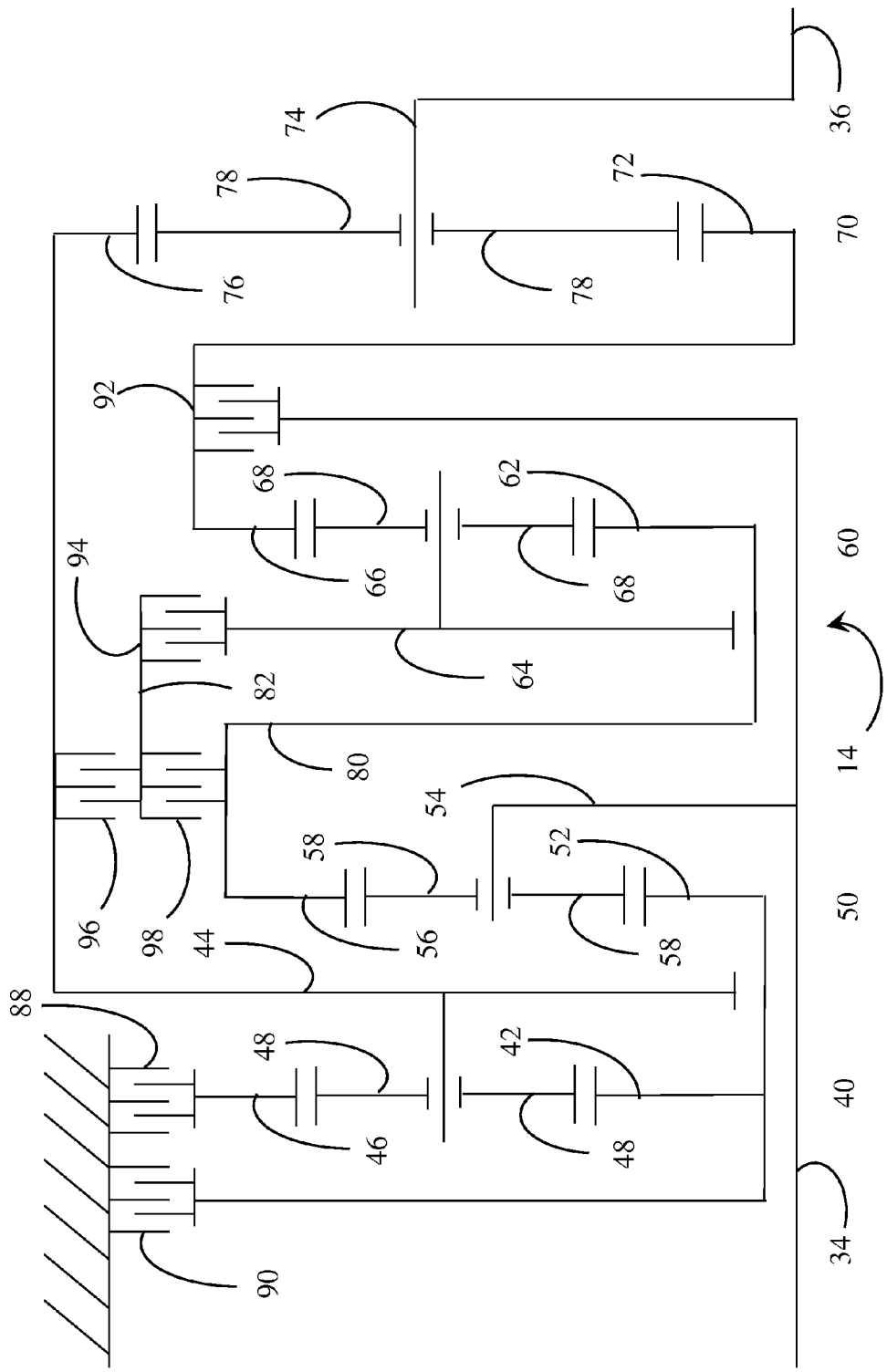
FIG. 2 is a schematic diagram of an exemplary transmission gearing arrangement suitable for use with the disclosed method.

An example gearbox is schematically illustrated in FIG. 2. The proposed method is applicable to a wide variety of gearbox arrangements. Gearbox 14 is driven by torque converter 16 through turbine shaft 34 and drives differential 24 through output shaft 36. The gearbox utilizes four simple planetary gear sets 40, 50, 60, and 70. Sun gear 42 is fixed to sun gear 52, carrier 44 is fixed to ring gear 76, ring gear 56 is fixed to sun gear 62, ring gear 66 is fixed to sun gear 72, turbine shaft 34 is fixed to carrier 54, and output shaft 36 is fixed to carrier 74. Ring gear 46 is selectively held against rotation by brake 88 and sun gears 42 and 52 are selectively held against rotation by brake 90. Turbine shaft 34 is selectively coupled to ring gear 66 and sun gear 72 by clutch 92. Intermediate shaft 82 is selectively coupled to carrier 64 by clutch 94, selectively coupled to carrier 44 and ring gear 76 by clutch 96, and selectively coupled to ring gear 56 and sun gear 62 by clutch 98.

As shown in Table 1, engaging the clutches and brakes in combinations of four establishes ten forward speed ratios and one reverse speed ratio between turbine shaft 34 and output shaft 36. An X indicates that the corresponding clutch is engaged to establish the speed ratio.

TABLE 1

|     | 88 | 90 | 92 | 94 | 96 | 98 | Ratio | Step |
|-----|----|----|----|----|----|----|-------|------|
| Rev | X  | X  |    | X  | X  |    | -4.79 | 102% |
| 1st | X  | X  | X  | X  |    |    | 4.70  |      |
| 2nd | X  | X  |    | X  |    | X  | 2.99  | 1.57 |
| 3rd | X  |    | X  | X  |    | X  | 2.18  | 1.37 |
| 4th | X  |    |    | X  | X  | X  | 1.80  | 1.21 |
| 5th | X  |    | X  |    | X  | X  | 1.54  | 1.17 |
| 6th | X  |    | X  | X  | X  |    | 1.29  | 1.19 |
| 7th |    |    | X  | X  | X  | X  | 1.00  | 1.29 |
| 8th |    | X  | X  | X  | X  |    | 0.85  | 1.17 |
| 9th |    | X  | X  |    | X  | X  | 0.69  | 1.24 |
| 10th |   | X  |    | X  | X  | X  | 0.64  | 1.08 |

All single step and two step shifts are performed by gradually engaging one clutch, called an oncoming element, while gradually releasing a different clutch, called the off-going element. During each of these shifts, three clutches, called holding elements, are maintained fully engaged while one element is maintained fully disengaged. In other gearbox arrangements, the number of holding elements may be different.

When the vehicle is coasting, the controller may cut off fuel to engine 12, permitting the vehicle inertia to keep the engine rotating by locking the torque converter bypass clutch 18 and leaving the gearbox 14 in a forward gear ratio. This reduces fuel consumption relative to placing the transmission in neutral or opening the bypass clutch and using fuel to keep the engine rotating. Vehicle occupants may notice a slight increase in vehicle deceleration rate. As the vehicle slows down, the engine speed drops proportionally. The ratio of engine speed to vehicle speed is determined by the transmission gear ratio. To avoid allowing the engine speed to decrease excessively, the controller periodically commands a transmission downshift. Unless steps are taken to control transmission output torque, the deceleration rate will increase dramatically during the shift event as vehicle inertia is transferred to the engine.

Figure 3:
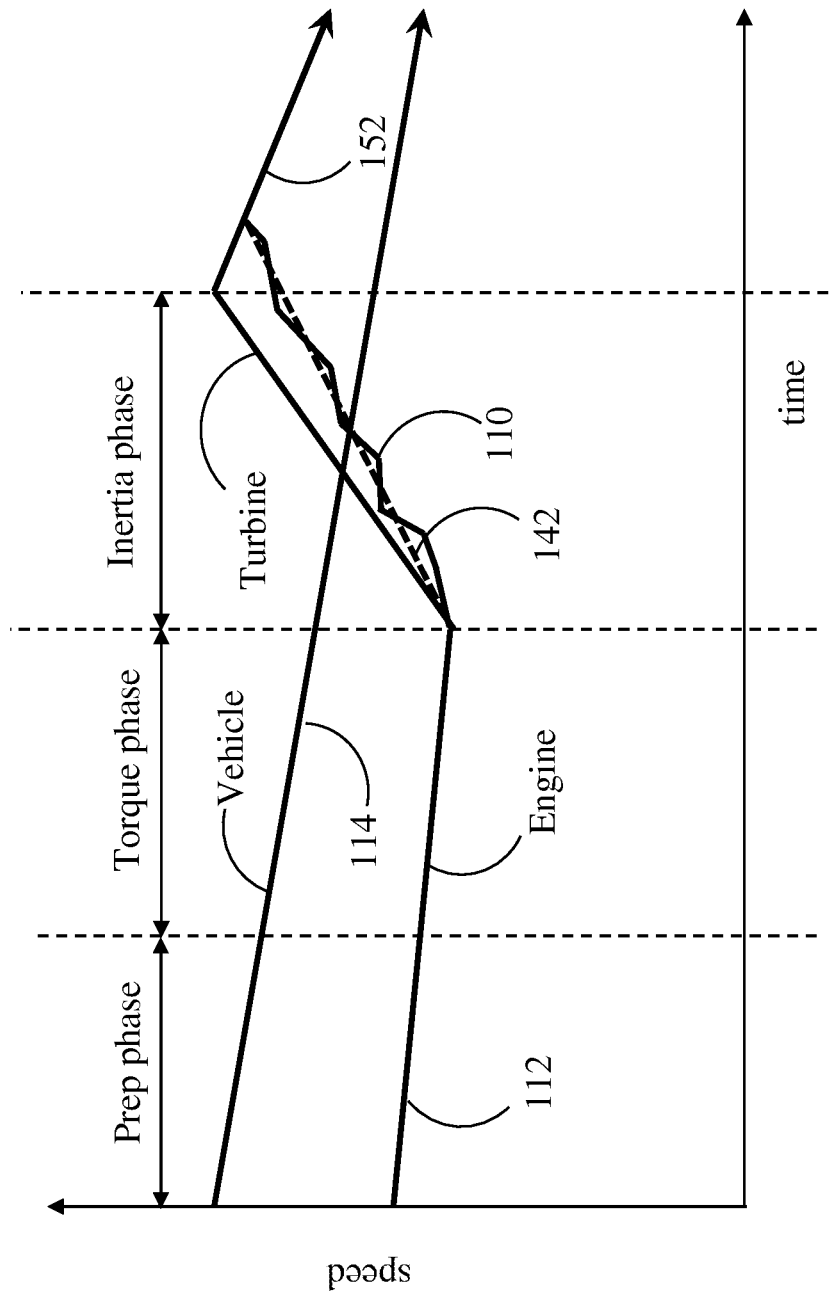
FIG. 3 is a graph of element speeds versus time during a coasting downshift according to the disclosed method.
Figure 4:
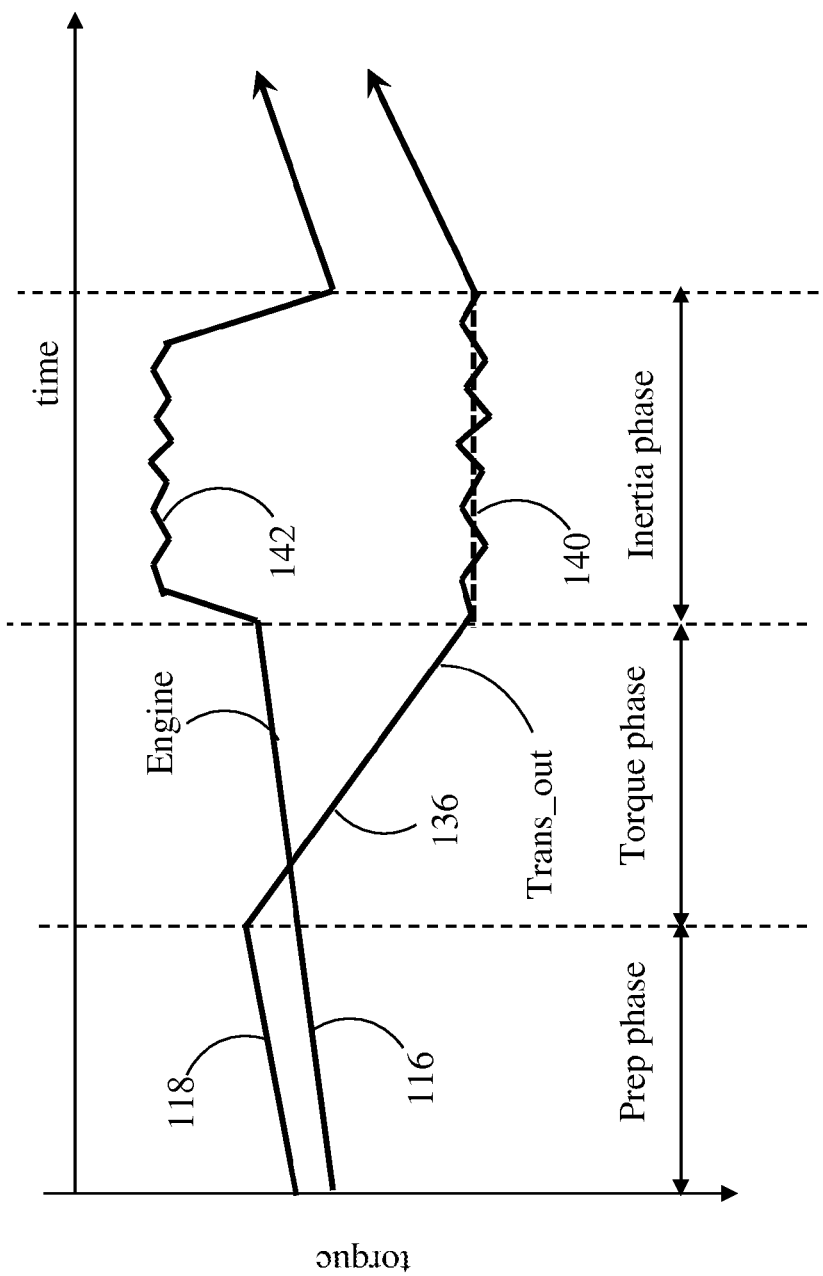
FIG. 4 is a graph of element torques versus time during a coasting downshift according to the disclosed method.
Figure 5:
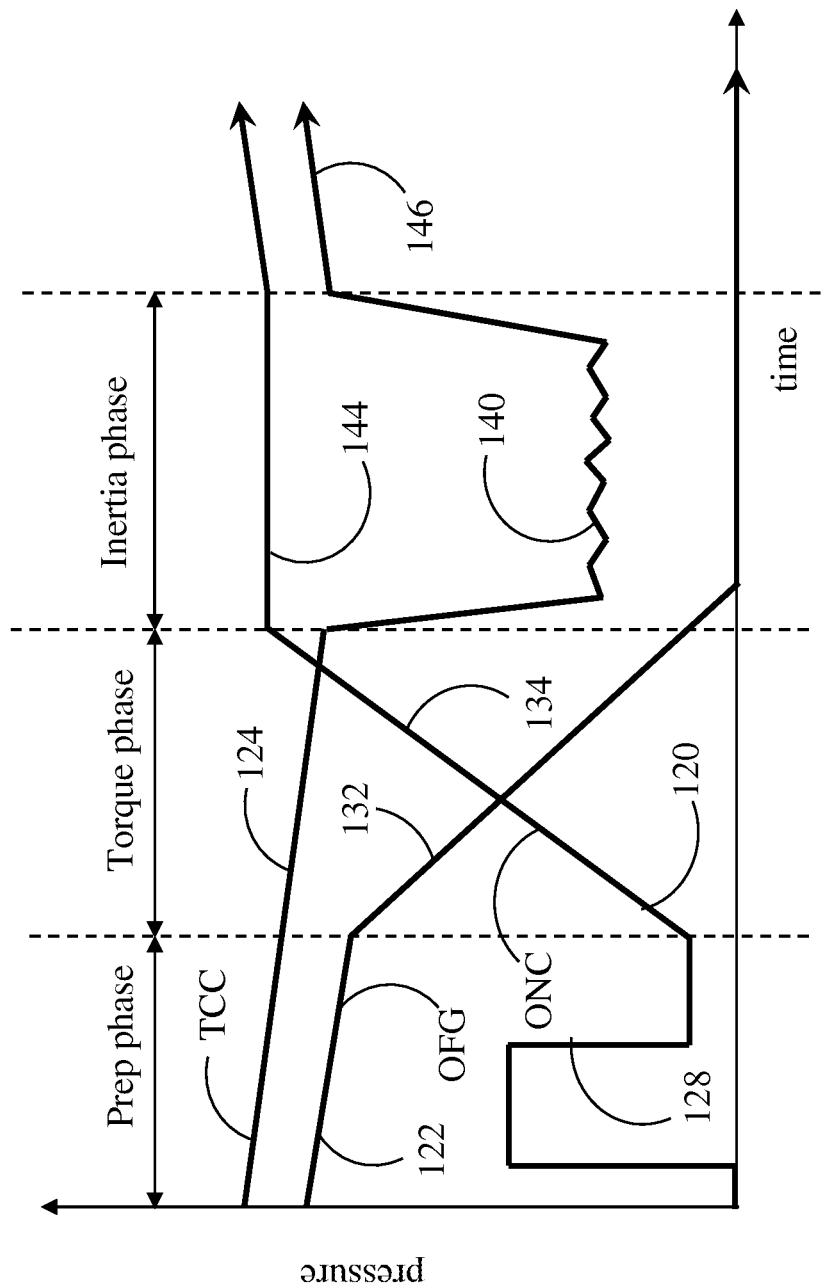
FIG. 5 is a graph of commanded pressures versus time during a coasting downshift according to the disclosed method.
Figure 6:
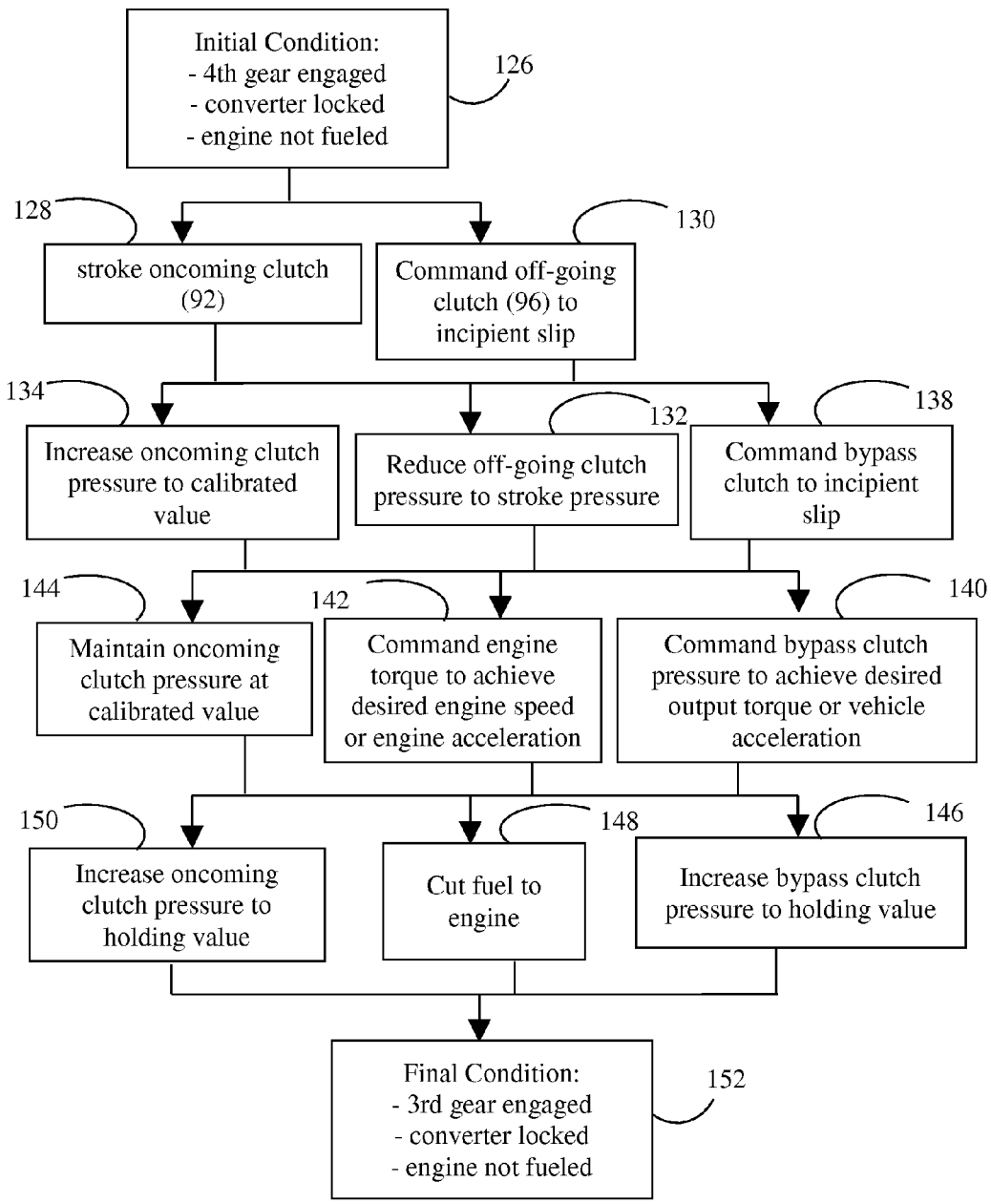
FIG. 6 is a flow chart illustrating the disclosed method.

FIGS. 3, 4, and 5 illustrate a coasting downshift, such as a shift from 4th gear to 3rd gear. In FIG. 3, line 110 represents the speed of engine 12, line 112 represents the speed of turbine 22, and line 114 represents the speed of the vehicle. Note that the engine and turbine have the same speed for much of the time period in question. In FIG. 4, line 116 represents the engine torque and line 118 represents the transmission output torque. Both torques are negative during the time period. In FIG. 5, line 120 represents the torque capacity of the oncoming clutch (92 for the 4-3 downshift), line 122 represents the torque capacity of the off-going clutch (96 for the 4-3 downshift), and line 124 represents the torque capacity of the torque converter bypass clutch 18. When these clutches are hydraulically actuated clutches, the torque capacity is set by adjusting the commanded pressure. FIG. 6 is a flow chart for the process illustrated in the graphs of FIGS. 3, 4, and 5.

Prior to initiation of the shift event, the vehicle is gradually slowing down with gearbox 14 in 4th gear and bypass clutch 18 locked. As shown in FIG. 3, engine speed decreases in proportion to vehicle speed. As shown in FIG. 4, engine torque tends to gradually become less negative as engine speed decreases. Because the transmission ratio is constant, transmission output torque also gradually becomes less negative. This condition is illustrated at 126 in FIG. 5. When a downshift is commanded, a preparatory phase begins. During this phase, the oncoming clutch pressure is briefly elevated to stroke clutch at 128 and the pressure to the off-going clutch is reduced to the level at which slip would begin at 130.

During the torque transfer phase, pressure to the off-going clutch is reduced to zero at 132 and pressure to the oncoming clutch is gradually increased at 134. During the torque phase, relative element speeds do not change, so the engine torque continues to gradually become less negative. However, since the power flow path through gearbox 14 changes to the power flow path associated with 3rd gear, the torque ratio changes to the 3rd gear ratio. Thus, as shown at 136 in FIG. 4, the transmission output torque becomes more negative. During the torque phase, pressure to the bypass clutch may be gradually reduced to incipient slip at 138 in preparation for later steps.

During the inertia phase, element speeds adjust to the relative values associated with 3rd gear. Thus, as shown in FIG. 3, even though the vehicle continues to slow down, the engine and turbine increase in speed. To avoid changes in engine speed and vehicle deceleration that would annoy vehicle occupants, the controller actively controls engine speed and transmission output torque. Closed loop control requires feedback signals. Some transmissions are equipped with torque sensors that can provide an output torque feedback signal. In other cases, a surrogate signal such as vehicle deceleration rate may be utilized as a feedback signal. As shown at 140 in FIGS. 4, 5, and 6, the pressure to the bypass clutch is varied in order to maintain a desired output torque versus time profile. As shown at 142 in FIGS. 3, 4, and 6, engine torque is varied in order to maintain a desired engine speed versus time profile or a desired engine acceleration rate. Engine torque may be made less negative by providing fuel. Variation in bypass clutch capacity will influence engine acceleration. Since the bypass clutch pressure in known, the controller may account for this effect by adding an open loop term to the engine torque command. The torque capacity of the oncoming clutch in maintained at a calibrated value at 144 during the inertia phase.

The transmission arrangement of FIG. 2 has several internal components with substantial rotating inertia which influence the behavior during particular shifts. During the inertia phase of the 4-3 downshift, clutches 88, 94, and 98 are engaged and clutch 92 is slipping. Because both clutch 94 and clutch 98 are engaged, ring gear 56, gear set 60, sun gear 72, clutches 94 and 98, and parts of clutches 96 and 92 all rotate as a single unit. The combined inertia of these elements is much larger than the inertia of the remaining rotating elements. During the inertia phase, both the bypass clutch and clutch 92 are acting to slow down carrier 54. The inertia rotating with ring 56 acts as a reaction to transfer this torque to sun gear 42 and 52. Clutch 88 acts as a reaction to transfer the torque on sun gear 42 to carrier 44 and ring gear 76. The inertia rotating with sun gear 72 acts as a reaction transmitting the torque on ring gear 76 to slow down the output.

If the bypass clutch is locked during the inertia phase, then the torque capacity of clutch 92 would impact both output torque and engine acceleration. Similarly, engine torque would impact both output torque and engine acceleration. This strong coupling complicates the controls. With the bypass clutch slipping, on the other hand, changes in engine torque do not impact output torque. The resulting semi-coupled system is easier to control.

The inertia phase ends when the element speeds within the transmission reach the relative speeds associated with 3rd gear. Specifically, the slip across oncoming clutch 92 goes to zero. The calibrated value of oncoming clutch torque capacity used at 144 is sufficient to ensure that the torque converter turbine rotates faster than the torque converter turbine throughout the inertia phase and to ensure that bypass clutch 18 has sufficient authority to achieve the desired output torque. Once the inertia phase is complete, the bypass clutch is again locked at 146 and fuel to the engine is again cut at 148. Pressure to the oncoming clutch is ramped to a holding value at 150. At the completion of the shift at 152, gearbox 14 is in 3rd gear with torque converter bypass clutch 18 locked. As shown in FIG. 3, the engine speed is again proportional to vehicle speed, but the ratio is different than before the shift. As shown in FIG. 4, both engine torque and transmission output torque gradually become less negative as the vehicle further decelerates, but the transmission output torque is a greater multiple of engine torque.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a transmission during a negative torque downshift comprising:

during a torque phase of the downshift, reducing an offgoing clutch torque capacity and increasing an oncoming clutch torque capacity; and reducing a third clutch torque capacity to induce slip across the third clutch, and then, during an inertia phase of the downshift, modulating the third clutch torque capacity based on a first feedback signal indicative of transmission output torque.

2. The method of claim 1 wherein the third clutch is a torque converter bypass clutch.

3. The method of claim 1 wherein the first feedback signal is generated by a transmission output torque sensor.

4. The method of claim 1 wherein the first feedback signal is a vehicle acceleration rate.

5. The method of claim 1 further comprising modulating a torque generated by an input power source based on a second feedback signal.

6. The method of claim 5 wherein variations in the torque generated by the input power source do not impact transmission output torque while the third clutch is slipping.

7. The method of claim 5 wherein the input power source is an internal combustion engine.

8. The method of claim 5 wherein the second feedback signal is a transmission input speed.

9. The method of claim 5 wherein the second feedback signal is a transmission input acceleration.

10. The method of claim 1 further comprising increasing the third clutch torque capacity following the inertia phase to eliminate slip across the third clutch.

11. A transmission comprising:
a discrete ratio gearbox having an input and an output;
a clutch configured to transmit torque between an engine and the gearbox input; and
a controller programmed to downshift the gearbox while power flows from the transmission output to the engine by modulating a torque capacity of the clutch during an inertia phase of the downshift based on a feedback signal indicative of transmission output torque.

12. The transmission of claim 11 further comprising a torque converter having an impeller fixed to the engine and a turbine fixed to the gearbox input.

13. The transmission of claim 11 further comprising a transmission output torque sensor.

14. The transmission of claim 11 wherein the controller is further programmed to increase the torque capacity following the inertia phase to eliminate slip across the clutch.

15. A transmission controller comprising:
input communication channels configured to receive a signal indicating a transmission output torque;
output communication channels configured to send a signal to vary a torque capacity of a torque converter bypass clutch; and
control logic configured to downshift the transmission while power flows from a transmission output to a transmission input by modulating the torque capacity of the bypass clutch during an inertia phase of the downshift based on the signal indicating transmission output torque.

16. The transmission controller of claim 15 wherein:
the input communication channels are further configured to receive a signal indicating an engine speed;
the output communication channels are further configured to send a signal to vary an engine torque; and
the control logic is further configured to modulate the engine torque during the inertia phase of the downshift based on the signal indicating engine speed.

17. The controller of claim 15 wherein the control logic is further programmed to increase the torque capacity of the bypass clutch following the inertia phase to eliminate slip across the bypass clutch.

* * * * *